June 17, 1930.  E. J. HILEMAN  1,764,404
ELECTRICALLY DRIVEN AGITATING MACHINE
Filed June 25, 1929    3 Sheets-Sheet 1
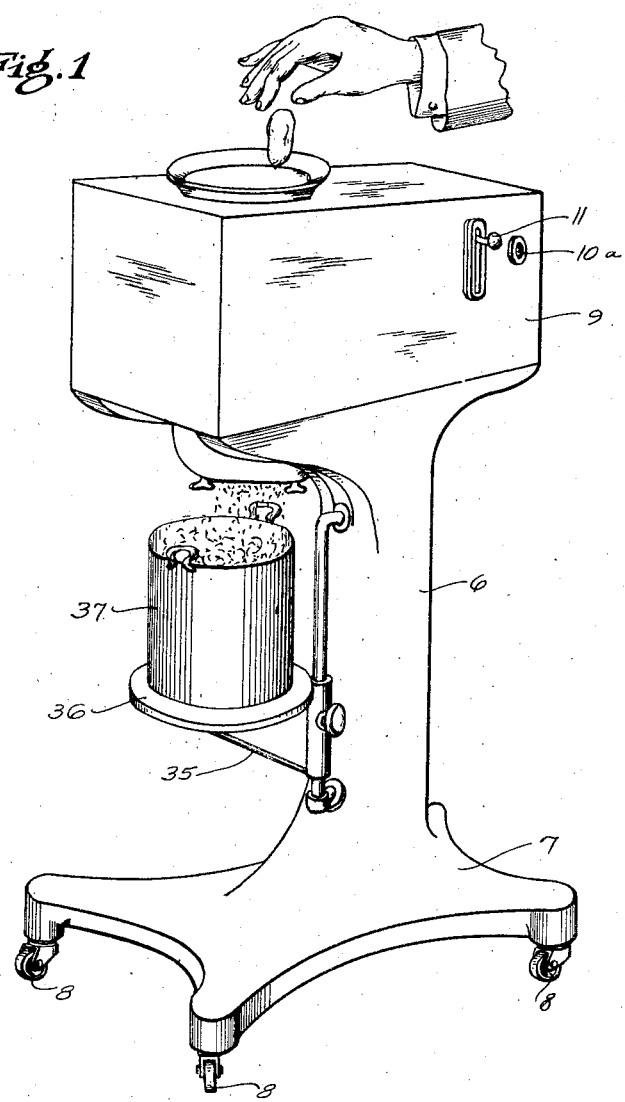
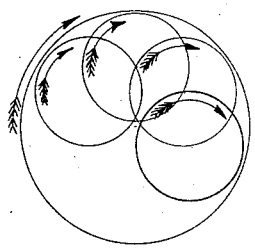
INVENTOR
Ernest J. Hileman
BY John A. Bommhardt
ATTORNEY June 17, 1930.  E. J. HILEMAN  1,764,404
ELECTRICALLY DRIVEN AGITATING MACHINE
Filed June 25, 1929  3 Sheets-Sheet 2
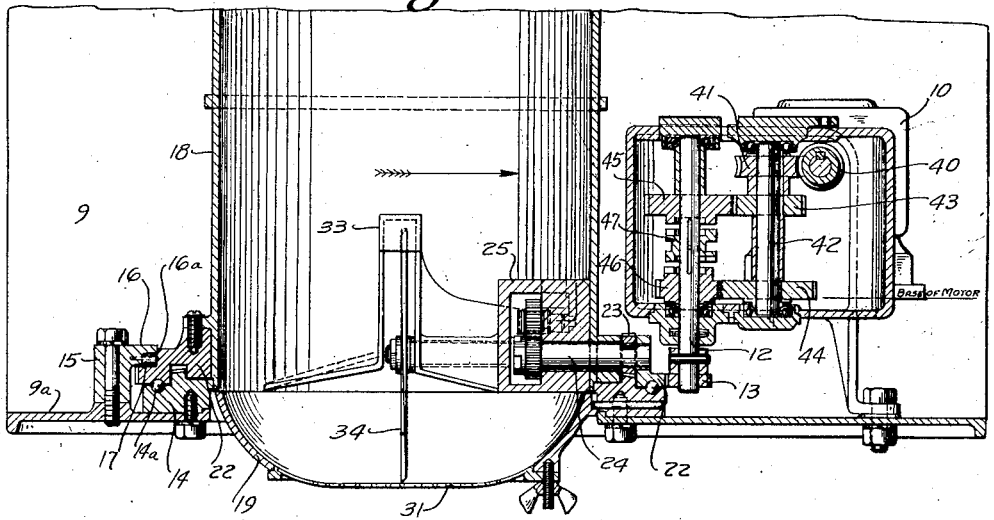
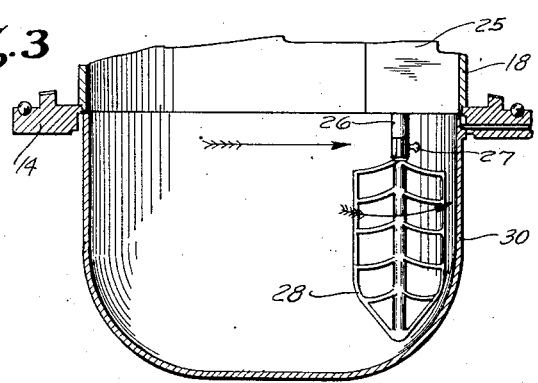
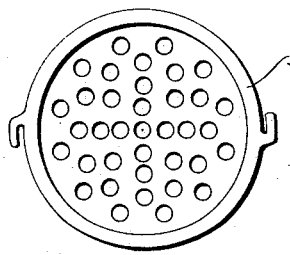
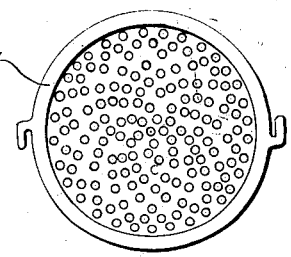
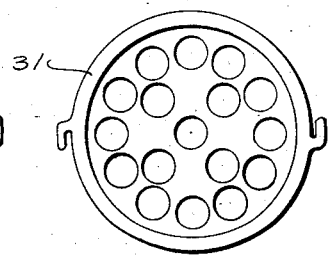
INVENTOR
Ernest J. Hileman
BY
John A. Bommhardt
ATTORNEY June 17, 1930.   E. J. HILEMAN   1,764,404
ELECTRICALLY DRIVEN AGITATING MACHINE
Filed June 25, 1929    3 Sheets-Sheet 3
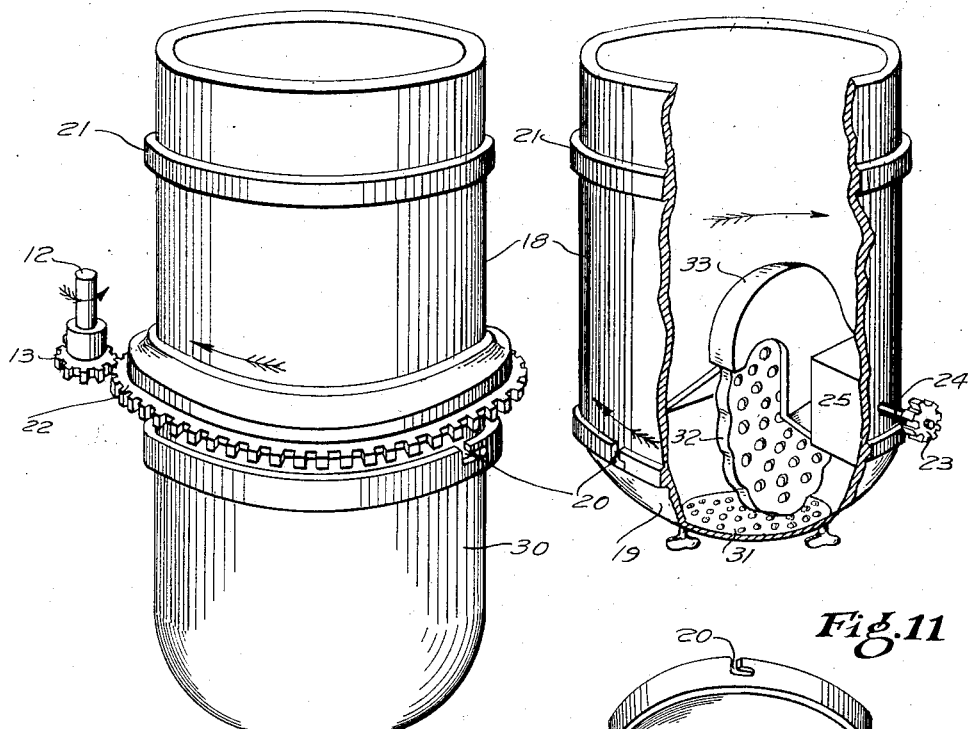
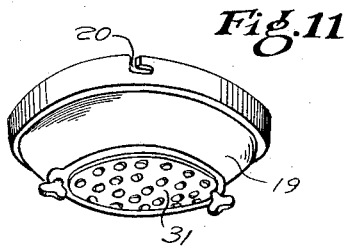
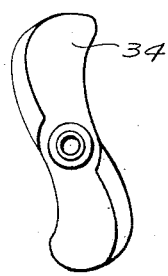
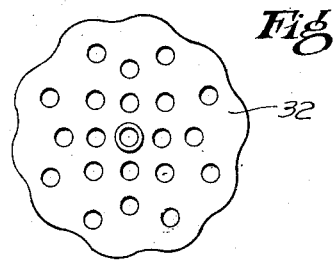
INVENTOR
Ernest J. Hileman
BY
John A. Bonnhardt
ATTORNEY Patented June 17, 1930

1,764,404

UNITED STATES PATENT OFFICE

ERNEST J. HILEMAN, OF DETROIT, MICHIGAN

ELECTRICALLY-DRIVEN AGITATING MACHINE

Application filed June 25, 1929. Serial No. 373,547.

This invention relates to electrically driven agitating machines of the type used in the kitchens of hotels, restaurants and hospitals for cutting, grating, whipping and beating foodstuffs.

An object of the invention is to provide a machine which can be used for whipping or beating or grating or cutting foodstuffs, the desired operation being determined by the operator, who at his or her will can apply the desired tool or implement in a very few minutes.

Another object resides in a stand enclosing the movable parts of the device and supported on rollers so that it can be moved from place to place.

Another object resides in an adjustable support associated with the stand to receive a receptacle for catching grated or cut foodstuffs as they are discharged from the machine.

Another object resides in a bowl or receptacle having means whereby the lower portion can quickly and easily be removed and another form substituted therefor.

Other objects and advantages will be seen when taken in connection with the accompanying description and drawings in which Fig. 1 is a perspective of the complete machine; Fig. 1ª is a diagram of the agitator movement; Fig. 2 is a detail in section showing the mounting of the bowl with the shallow bowl and knife attachment; Fig. 3 is a view similar to Fig. 2 but with the deep bowl and beater attached; Fig. 4 is a side elevation of the whip attachment; Figs. 5, 6 and 7 show plans of different sized sieves adapted to be attached to the shallow bowl bottom; Fig. 8 is a perspective view of the operating bowl showing the gears and driving means; Fig. 9 is a broken perspective view showing the grater in position with guard and the sieve in place at the bottom. Fig. 10 is a side elevation of the cutting knife. Fig. 11 is a perspective view of the shallow bowl with sieve attached; Fig. 12 is a side elevation of the grater.

In the drawings 6 indicates a standard mounted on a base 7 provided with casters 8 so that it can be moved around. The standard 6 supports at its top a box or casting 9 which contains an electric motor 10 from which power is derived. This motor may be controlled by a switch 10ª including high and low speeds, the operating handle for which is indicated at 11. Through suitable gearing the motor drives a shaft 12 having a pinion 13. A stationary ring gear 14 is mounted in the casing 9 and it surrounds the bowl to be described. A series of retaining blocks 15 are also mounted on the base 9ª of the casing 9 and each has a lip 16 provided with a roller 16ª which overhangs a shoulder 17 on a ring gear 22 secured to the bowl, to hold the latter in position. The ring gear rests on ball bearings 14ª on the gear casting 14.

The gearing between the motor and the drive pinion 13 includes a worm 40 on the motor shaft which meshes with a worm gear 41 at the top of the shaft 42 which carries change speed gears 43 and 44 fixed thereto, these gears respectively meshing with corresponding clutch gears 45 and 46 loose on the shaft 12, between which gears is a sliding clutch collar 47 splined on the shaft and shiftable by a lever to engage either gear and vary the speed of the shaft 12 accordingly.

In Figs. 2 and 3 the bowl is formed in two parts, an upper part 18 and lower parts 19 and 30 respectively, the latter being cup shaped or closed. These two parts are joined by a bayonet joint at 20 so that the lower part can be detached. The upper part has a shoulder 21 which may rest on a bearing in the casing 9 to assist in supporting the bowl so that it can be rotated. Said upper part is also provided with an external ring gear 22 which meshes with the driving pinion 13. Mounted in a recess in the ring gear 22 is a pinion 23 the shaft 24 of which extends through the wall of the bowl section 18 into a gear box 25 which contains a set of gears through which motion is communicated to a vertical shaft 26 (Fig. 3) which is disposed eccentrically in the bowl. Any tool or implement desired may be connected to the shaft 26 by a set screw 27. In the form shown in Fig. 3 a beater 28 is employed. Fig. 4 shows a whipper 29 which may be substituted.

In the operation of the form thus far described the pinion 13 by its engagement with the ring gear 22 revolves the bowl which contains the material being beaten or whipped. As the bowl revolves the engagement of the pinion 23 with the stationary ring gear 14 rotates the shaft 24 and, through the gears in the box 25, the shaft 26 and the beater or whipper secured thereto. The axis of the beater being eccentric it thus describes in effect an orbital path with respect to the bowl and so effectively reaches all parts of the material therein. See Fig. 1ª.

For other uses, various substitutions can be made. Thus the bowl section 30 can be removed and a bowl section 19 provided with a sieve 31 may be substituted as shown in Figs. 2 and 9 the beater 28 being removed. In this form the shaft 24 is provided with a grater 32 which is rotated when the bowl is revolved, for grating material in the bowl, the material escaping through the holes in the sieve 31, various forms of which may be used as illustrated in Figs. 7, 8 and 9. For use with a grater a guard 33 is mounted in the bowl to cover the grater and prevent injury to the hands of a person inserting material in the bowl. Instead of the grater a knife 34 may be substituted for cutting the material.

It will be seen that all of the forms embody a revolvable bowl which may or may not have a sieve at the bottom, and a beater, cutter or grater which is driven in consequence of the rotation of the bowl, the power being derived from the same source.

The standard 6 has a rod 35 on which is an adjustable bracket 36 for supporting a receptacle 37 to receive the material discharged from the bowl.

The device is capable of various uses in the kitchen and gives a compound movement which is very effective for performing the operations described.

I claim:

1. In a machine of the kind described, the combination of a revolvable bowl, a ring gear surrounding the same, means to revolve the bowl, a rotary tool in the bowl and revoluble therewith, and means actuated by the gear to rotate the tool when the bowl is revolved.

2. The combination stated in claim 1, the last mentioned means including a pinion engaging the gear and a shaft driven by the pinion and operatively connected to the tool.

3. The combination stated in claim 1, the axis of the tool being eccentric to the axis of the bowl.

4. The combination stated in claim 1, the bowl having a detachable lower section.

5. The combination stated in claim 1, the bowl having a removable sieve at the bottom.

6. The combination of a revolvable bowl, means to revolve the same, a relatively fixed ring gear surrounding the bowl, a shaft extending through the wall of the bowl and provided with a pinion engaging the gear, and a tool connected to the shaft within the bowl.

7. The combination of a standard having a casing at the top, a ring gear fixed in the casing, a bowl revolvably mounted in the casing, within the ring gear, a motor in the casing operatively connected to the bowl to revolve the same, a rotary tool mounted in and carried by the bowl, and gearing between the ring gear and the tool.

8. The combination stated in claim 7, and a receptacle holder mounted on the standard under the bowl, the bowl having a sieve through which material is discharged into the receptacle.

In testimony whereof, I do affix my signature.

ERNEST J. HILEMAN.